May 7, 1929.  E. C. LANGE ET AL  1,712,388
SEAT FOR GRANDSTANDS AND THE LIKE

Filed March 4, 1927

INVENTOR.
Edwin C. Lange
Samuel J. Nicholson

ATTORNEY.

Patented May 7, 1929.

1,712,388

UNITED STATES PATENT OFFICE.

EDWIN C. LANGE AND SAMUEL J. NICHOLSON, OF CEDAR POINT, KANSAS, ASSIGNORS OF ONE-THIRD TO CHARLES F. CAMPBELL, OF EMPORIA, KANSAS.

SEAT FOR GRANDSTANDS AND THE LIKE.

Application filed March 4, 1927. Serial No. 172,854.

Our invention relates to improvements in seats for grand stands and the like.

The object of our invention is to provide a seat having a hinged lid functioning as a back.

A further object of our invention is to provide a seat positioned within a housing having a hingedly connected lid with a cushion positioned on the inside thereof functioning as a back for the seat.

A still further object of our invention is to provide a seat with a back hingedly connected and a spring lock to engage when closed.

These and other objects will hereinafter be more fully explained.

Referring to the drawings.

The mechanism herein disclosed functions as one unit, a number of which may be placed with ends abutting or nearly so along the seat of grand stands or auditoriums: or they may be built in with the seats so that the lid or back when closed will function as a ledge. When a cushion is desired for the seat and back the lock may be coin operated to open the same.

As a concise description of the seat, 1 is a housing having a cushion 2 positioned therein and carried by a panel 2'. The said panel is pivotally carried at the rear as at A by brackets 3, the said brackets being rigidly attached to the lid 4 and rocked thereby, it being understood that the lid is hingedly connected to the housing at the rear side. Positioned on the inside of said lid is a cushion 4' securely attached thereto. The front of the cushion panel 2' slidably engages on a slanting member 5 when actuated by the opening and closing of the lid. When the lid is open, the front of the seat is carried on a level plane of the member 5 as at B, the rear side being carried by the brackets 3.

Figure 2:
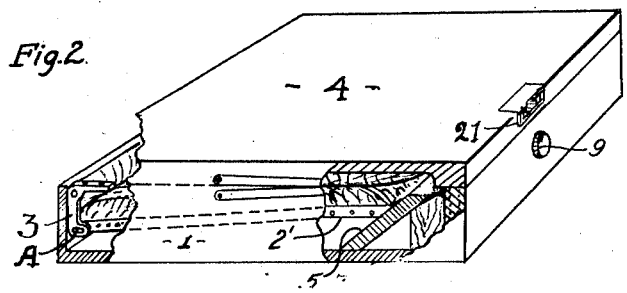
Fig. 2 is a perspective view of the seat, closed and locked.

Pivotally connected to the lid and housing are rule jointed tie members 6, said members adapted to fold when the lid is closed as shown in Fig. 2, and function as a supporting means when the lid is open as a back for the seat.

It will be understood that this type of seat is for rental purpose, and the lid thereof may be locked in a closed position by any standard type of locking means and on receipt of a rental payment the lid may be opened for the occupant; or if leased for a period of time the key for the lock may be placed in the possession of the lessee. However, a coin operated lock may be employed, but such I do not claim broadly in connection with the seat.

Positioned on the front of the top and hingedly connected thereto is a lift 21 by which means the top is raised.

Figure 1:
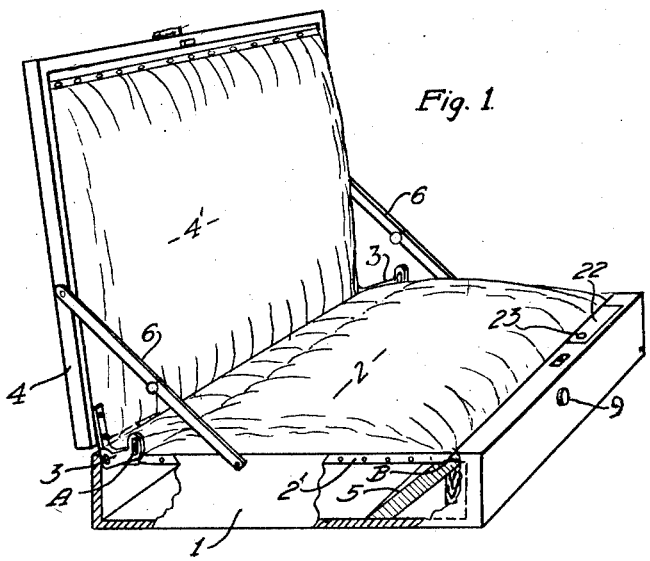
Fig. 1 is a perspective view of the seat open for occupancy, parts removed for convenience of illustration.

As accessible means to the coin depository we have provided a hingedly connected lid 22 as shown in Fig. 1, the said lid having a key operated lock 23. Note that the said lid is concealed by the first said lid when locked to the housing.

Such modifications may be employed as lie within the scope of the appended claims.

Having thus described our invention, what we claim as new and desire to secure by Letters Patent is:—

1. In an improvement in seats for grandstands and the like, a housing, and a lid hingedly connected to the housing, the housing having a slantingly positioned member adjacent the front side thereof, a seat slidably engaged on the said member to its normal height as the lid is opened, a slotted bracket attached to each corner of the lid adjacent the hinge, and a pin attached to each of the rear corners of the seat, the pins outwardly extending to engage in the slot of their respective brackets, by which means the rear of the seat is raised when the lid is opened, and means to support the lid in its open position as resistance against the weight of the seat.

2. In an improvement in seats for grandstands and the like, the combination of a housing, a seat, of a member slantingly positioned on one side of the housing to slidably engage one side of the seat, of a lid hingedly connected to the housing and having a bracket at each corner adjacent the hinged side, each of the said brackets having an outwardly extending arm with a slot upwardly extending on the outer end thereof, a pin positioned on the rear corners of the seat and engaging in the slot, of rule jointed members connected to the back and housing, as locking means for the open position of the back, all substantially as shown.

In testimony whereof we affix our signatures.

EDWIN C. LANGE.
SAMUEL J. NICHOLSON.